United States Patent [19]
Eloranta et al.

[11] 3,750,543
[45] Aug. 7, 1973

[54] FOCUS RESPONSIVE EXPOSURE CONTROL SYSTEM

[75] Inventors: Vaito K. Eloranta, Needham; Edwin K. Shenk, Littleton, both of Mass.

[73] Assignee: Polaroid Corporation, Cambridge, Mass.

[22] Filed: Apr. 19, 1971

[21] Appl. No.: 135,211

[52] U.S. Cl........... 95/10 CE, 95/10 CT, 95/10 CD, 95/64 A, 95/64 D
[51] Int. Cl...... G03b 7/08, G03b 7/16, G03b 15/05
[58] Field of Search ...................... 95/10 CE, 10 CT, 95/10 CD, 64 R, 64 A, 64 D

[56] References Cited
UNITED STATES PATENTS

| | | | |
|---|---|---|---|
| 3,641,889 | 2/1972 | Eloranta | 95/10 CE |
| 3,605,588 | 9/1971 | Ort et al. | 95/64 R |

Primary Examiner—Samuel S. Matthews
Assistant Examiner—Russell E. Adams, Jr.
Attorney—Brown & Mikulka and Gerald L. Smith

[57] ABSTRACT

An exposure control system for a single lens reflex camera. The system incorporates an exposure mechanism having a normally open status for camera viewing and focusing. An exposure cycle is commenced upon energization of a solenoid which drives the exposure mechanism to a closed position. This solenoid is de-energized to commence an exposure interval at which time the blades of the exposure mechanism are driven under spring bias to define a progressively varying exposure aperture. The solenoid is re-energized to terminate an interval of exposure. For flash operation, a second solenoid driven arrangement is provided which selectively inserts a stop within the locus of travel of the blades of the exposure mechanism to arrest their movement under spring bias at an aperture setting automatically selected in correspondence with the focusing adjustment of the camera.

50 Claims, 7 Drawing Figures

INVENTORS
VAITO K. ELORANTA
EDWIN K. SHENK
BY Brown and Mikulka
and
Gerald L. Smith
ATTORNEYS

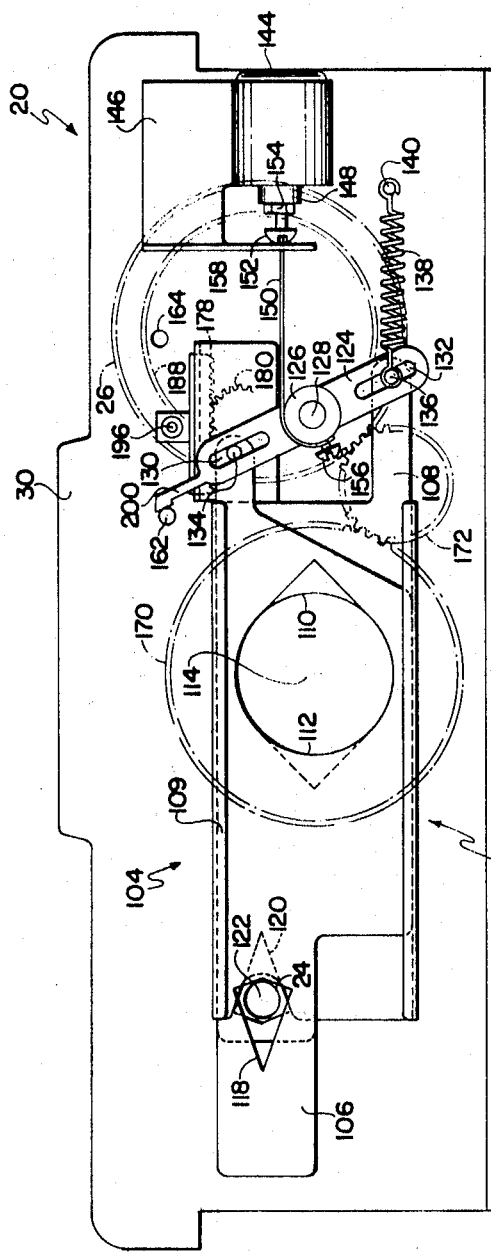

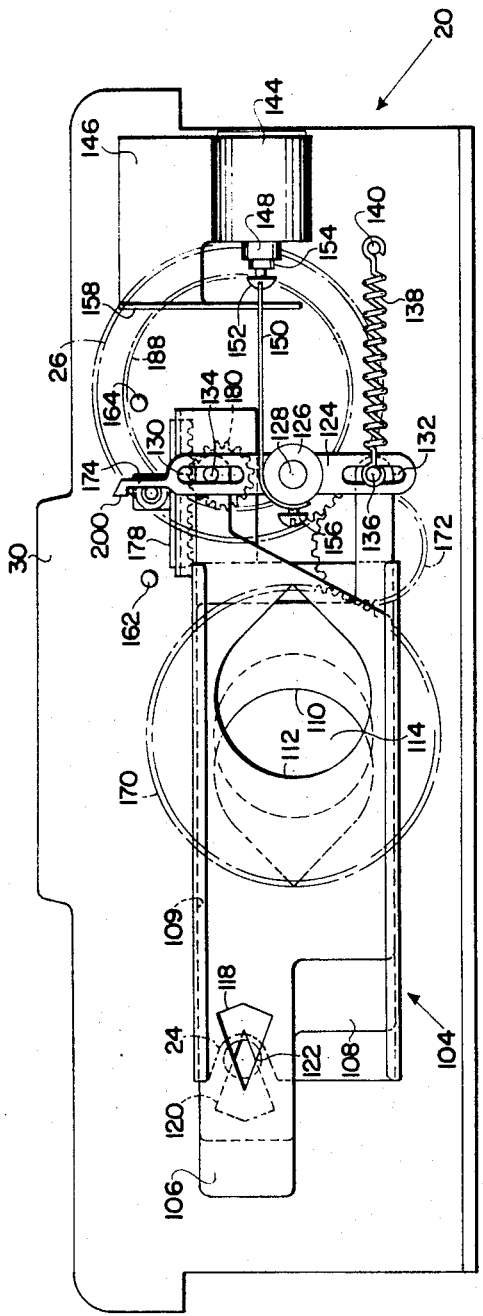
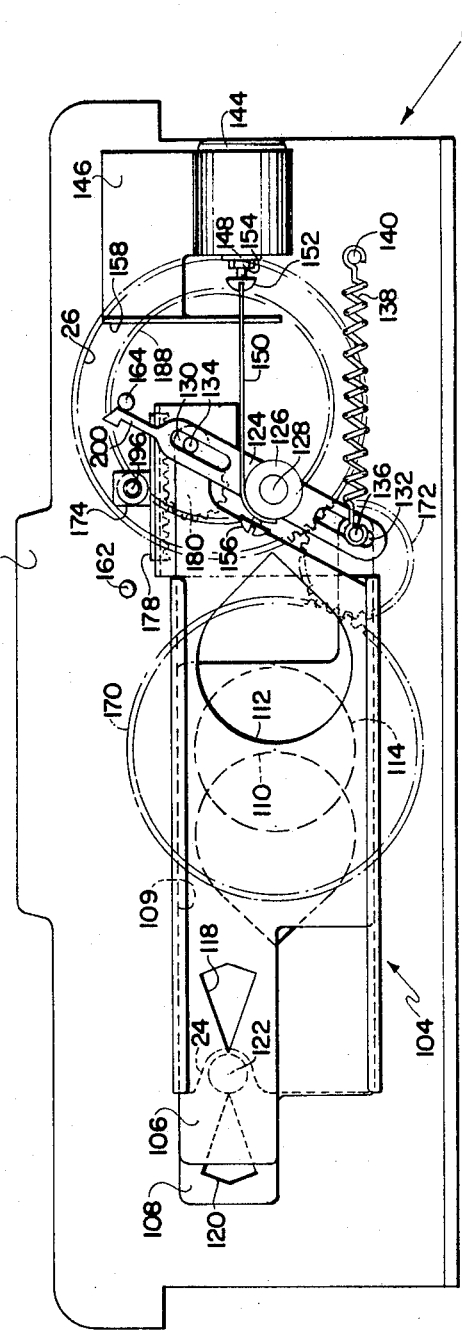
FIG. 6
FIG. 5
INVENTORS
VAITO K. ELORANTA
EDWIN K. SHENK
BY Brown and Mikulka
and
Gerald L. Smith
ATTORNEYS

FOCUS RESPONSIVE EXPOSURE CONTROL SYSTEM

BACKGROUND OF THE INVENTION

When operated in conjunction with flash or transient illumination, the exposure mechanisms of photographic cameras typically are adjusted in accordance with the levels of illumination anticipated at a subject being photographed. To anticipate these levels, photographers generally turn to an analytic lighting evaluation derived from the characteristics of the flash light source. This approach fundamentally is based upon an application of the inverse square law for light energy propagation. Under this law, the light energy available from a given source is considered to vary inversely with the square of the distance from that source. For any given photographic situation, a photographer makes use of the law by initially determining the light source-to-subject distance; then, by simple computation, this distance is factored into a reference or guide number correlating light energy with distance, lens and reflector characteristics and film sensitivity to evolve an illuminational factor or exposure value. The camera exposure mechanism is then manually adjusted to a conformance with the pre-computed exposure value. This adjustment is generally carried out through an appropriate exposure aperture setting.

In some camera designs, exposure control adjustment for flash operation is effected semi-automatically by incorporating within the apparatus what is termed as a "follow-focus" mechanism. With a follow-focus arrangement, aperture adjustment or a flash illumination output control is mechanically coupled with the range finding or focusing system of a camera.

For many applications, the adaption of conventional photographic aperture mechanisms to semi-automatic follow-focus operation is not simply carried out. As it becomes more and more desirable to construct cameras in thin and compact configurations suited to be carried conveniently within a pocket of a garment, a provision for dual exposure regulating systems becomes difficult to realize with acceptable design efficiencies and economies. This dualism requirement stems from the above-discussed different basis upon which scene lighting is evaluated for flash as opposed to ambient or daylight illumination. Particularly where aperture is adjusted as a follow-focus procedure, the exposure control housing of a camera must incorporate one aperture adjustment mechanism for daylight regulation as well as a second adjustment mechanism which is operative only during flash illuminated exposures, which is mechanically coupled with the focusing system of the camera, and which otherwise does not interfere with the daylight or ambient mode exposure regulating system. An incorporation of such dual regulation systems within fully automated but thin and compact cameras presents even more severe design considerations.

Such automated cameras should perform automatically in a flash mode upon the mounting of a flash illuminating unit and should return to normal ambient mode operation automatically upon the demounting of such illuminating units. The follow-focus components of the exposure control system must be so designed as not to interfere with operation of the components of the ambient lighting exposure control apparatus.

In one fully automated but thin and compact camera described in a U. S. Pat. No. 3,641,889 entitled, "Exposure Control System" by Vaito K. Eloranta, an exposure control system is provided wherein both aperture and exposure interval are automatically varied in accordance with scene lighting conditions. Additionally, this exposure control system operates in conjunction with a single lens reflex viewing system as well as a motorized automatic film processing arrangement. Exposure regulation within the thin, compact camera takes place as part of a multi-step program involving the conversion of an optical path between viewing and exposure operational modes. As part of this program, the exposure mechanism of the camera initially operates in a relaxation mode wherein the shutter-aperture blades thereof are normally fully open at maximum aperture to permit optimum viewing and focusing of a photographic subject. Following the depression of a start or actuator button, the exposure mechanism is converted to a driven mode wherein the optical path of the camera is fully blocked as a reflex operator assembly is moved into its exposure position. Following an appropriate delay sufficient to permit the camera to convert to its exposure mode, the exposure mechanism is converted to a relaxation mode during which exposure is automatically controlled in accordance with ambient scene lighting. An exposure interval is terminated by the return of the exposure mechanism to its driven mode to close the optical path. This mode is sustained while the reflex operator assembly is returned to its viewing mode orientation. Additionally, a film unit, exposed during the exposure interval, is automatically driven through a processing station. Following a resumption of a viewing operational mode, the exposure mechanism is returned to its relaxation mode.

A follow-focus system for such a camera requires that the exposure mechanism provide for aperture adjustment in accordance with subject range when the camera is operated in conjunction with a flash source of illumination. Further, the camera must automatically convert to flash mode performance upon the mounting thereon of a flash unit. Additionally, flash mode performance of the exposure mechanism must be provided under design criteria in which the exposure system is capable of operating within the complex program logic of the reflex camera and does not conflict with its operation under ambient lighting conditions.

SUMMARY OF THE INVENTION

The invention now presented offers a fully automatic exposure control system having follow-focus capability. Of particular merit, this system readily provides for a range responsive aperture adjustment within the extremely limited confines of a thin, compact photographic camera suited for facile carrying within the pocket of a garment.

As an added feature, the exposure control system of the invention is automatically convertible to flash mode operation upon the removable mounting of a flash unit upon a camera within which it is incorporated.

The follow-focus feature of the exposure system of the invention is uniquely actuated during a photographic cycle through the use of an electromagnetically driven arrangement present in the form of a solenoid. When selectively actuated, resulting from the attachment of the flash unit upon the apparatus, the solenoid driven follow-focus arrangement causes an exposure mechanism to establish an aperture value over the optical path of the camera corresponding to the focusing or range adjustments of the taking lens thereof. During daylight operation of the camera, this range responsive aperture adjusting feature is both inoperative and fully isolated from the normal ambient operation of the automatic exposure control system.

Another feature and object of the invention is to provide an exposure control system for photographic apparatus incorporating an exposure regulator arrangement having a driven mode effective to block the passage of light along the optical path of the apparatus and a relaxation mode effective to progressively unblock this path to derive a predetermined aperture variation thereover. The exposure control system incorporates a solenoid drive arrangement which is adjustable in accordance with the focus adjustment of a taking lens of the apparatus. Through selective energization of this solenoid drive arrangement, the exposure regulator arrangement can be intercepted in its relaxation mode to cause it to operate in a follow-focus manner.

A further feature and object of the invention is to provide a follow-focus exposure control system for a single lens reflex camera, the optical path of which is altered by a reflex operator assembly for purposes of converting the camera from a viewing mode to an exposure mode. The control system incorporates a shutter-aperture exposure regulating assembly wherein two mutually coactive blades are selectively driven by a solenoid into a position blocking the optical path of the camera. Exposure regulation is provided by releasing the blades from this blocking position to define progressively varying values of exposure aperture over the optical path. The shutter-aperture is driven by the solenoid into a blocking position during those intervals of a photographic cycle wherein the reflex operator assembly is moved between its operative positions. Through the use of a second solenoid driven assembly, an arrangement is provided for intercepting the exposure regulator assembly during movement from its blocking position to provide a focus related aperture adjustment during flash illuminated exposures. By selectively de-energizing this second solenoid during a photographic cycle, the shutter-aperture regulator arrangement is permitted to return to its normal or daylight operation at such time following an exposure interval when the reflex operator assembly is returned to a viewing mode position.

Because of the relative simplicity of the exposure control system of the invention, it readily may be incorporated within cameras of thin, compact design. Because of the technique utilized in establishing a focus related aperture adjustment with the system, it is readily incorporated within fully automated single lens reflex cameras having somewhat detailed or complex operational programs.

Other objects of the invention will become apparent in the course of the description to follow.

The invention accordingly comprises the system and apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 2 is a front sectional view of the exposure housing the camera of FIG. 1 with portions removed to reveal the internal structure;

FIG. 3 is a side view of the exposure housing of FIG. 2;

FIG. 4 is a fragmentary view showing select components of the exposure mechanism of FIG. 2 in enlarged detail;

FIG. 5 is a front sectional view of the exposure housing of a camera of FIG. 1 showing certain components of its exposure mechanism as they assume an orientation blocking the optical path of the camera;

FIG. 6 is another view of the orientation of components shown in FIG. 5, but at an intermediate stage within a photographic cycle.

DETAILED DESCRIPTION OF THE INVENTION

The exposure control system of the present invention is ideally suited for incorporation within a fully automated single lens reflex camera. To perform in reflex fashion, these cameras incorporate a reflex operator assembly which is normally retained in a viewing mode orientation permitting a scene to be framed and focused at a viewing surface formed within or upon the assembly. To derive adequate lighting for purposes of viewing and focusing the camera, the exposure control system thereof maintains a full aperture opening and open shutter until the camera is actuated to commence a photographic cycle. When the camera is so actuated, the shutter is fully closed to secure its exposure chamber while the reflex operator assembly is moved into its exposure orientation. Once converted for exposure mode operation, an exposure is made following which the shutter is again held fully closed while the reflex operator assembly is returned to its initial viewing mode orientation. As this orientation is again reached, maximum aperture width is again established and the shutter is permitted to open to provide for viewing and focusing in preparation for a subsequent photographic cycle.

Figure 1:
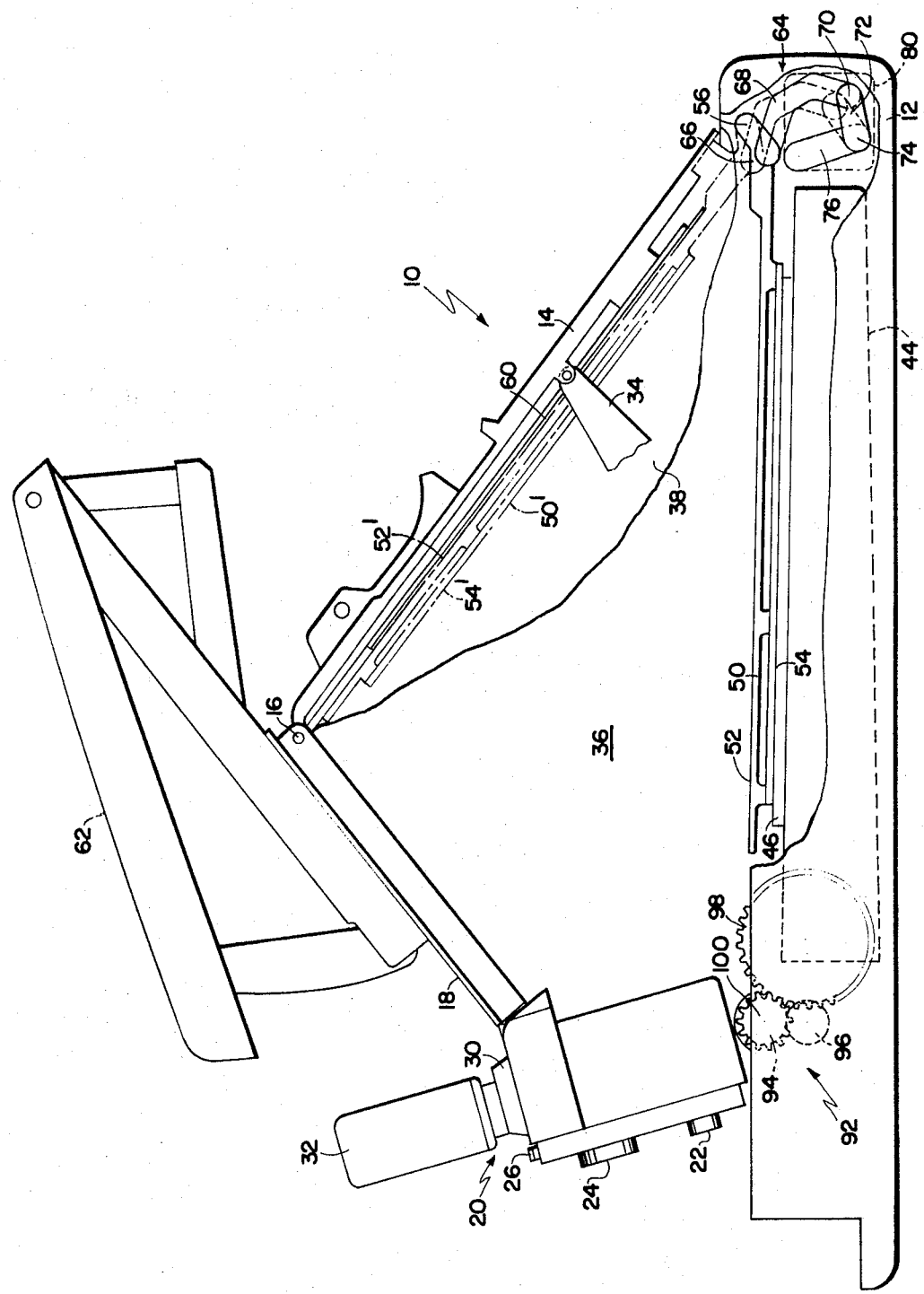
FIG. 1 is a side elevational view of a single lens reflex camera of a type within which the exposure system of the invention may be incorporated, portions of the figure being broken away or shown in phantom to reveal internal structure.

Referring to FIG. 1, a single lens reflex camera, suited to incorporate the exposure control system of the invention, is depicted generally at 10. Camera 10 is of a foldable variety and is formed of a combination of inter-linked walls and housing members which are pivotally collapsible in to a rectangular base or housing structure 12. For instance, the structure of camera 10 includes an elongated top wall 14 which is hinged to the rearward top portion of base 12. Wall 14 is hinged at its uppermost edge to a shorter forward wall 16 which, in turn, is hinged to the upper surface of an exposure housing 18. Exposure housing 18 is pivotally attached to the forward portion of base 12 so as to nest therewithin when the camera 10 is folded for carrying.

In the erected position shown, exposure housing 20 positions the centrally disposed optical objective or taking lens assembly of the camera in a position appropriate for making an exposure. Positioned appropriately across this optical path is an exposure regulating mechanism including a shutter-aperture assembly along with the control components of the exposure system of the camera. Among these control components are a "start" button 22, a light sensing entrance assembly 24, a focus adjusting wheel 26 and a flash unit supporting platform 30. Platform 30 is configured to support a packaged linear multilamp flash assembly as at 32.

In the erected configuration of the camera 10 as shown, rear wall 14 is supported by erecting linkages as at 34. The interconnection of rear wall 14, top wall 18, and exposure housing 20, serves to provide an exposure chamber 36, the lighttight integrity of which is provided by a flexible opaque bellows, a fragment of which is shown at 38.

Base 12 is configured at the bottom of exposure chamber 36 to receive and support a disposable film retaining cassette structure, a side of which is shown at 44. Cassette structure 44 is of rectangular configuration and retains a stacked array of discrete film units, the uppermost one of which is positioned in coincidence with the exposure plane of the camera 10. This plane is positioned just beneath a rectangular opening or film frame defined within a ridge 46 formed within the upper surface of cassette structure 44. Cassette 44 also contains a flat battery power supply in its lowermost portion which communicates with terminals (not shown) within the base 12. Additionally, the forwardmost peripheral side of cassette 44 is formed having an egress opening or slot through which the uppermost film unit automatically is removed for processing following its exposure. Film units suited for use with the camera 10 are described in detail in a patent by E. H. Land, U.S. Pat. No. 3,415,644, entitled, "Novel Photographic Products and Processes." In the orientation shown in FIG. 1, the components of camera 10 provide for its operation in a viewing mode in which framing and focusing are carried out by the operator. In this configuration, a reflex operator assembly 50 is retained in a spring-loaded or cocked orientation over the ridge 46 of cassette 44, blocking the passage of light through the film frame defined thereby. Operator assembly 50 is configured on one side to support a viewing surface 52 which faces into the exposure chamber 36 during viewing and focusing procedures. Assembly 50 supports a mirror or similarly specularly reflecting surface 54 upon its somewhat flat surface opposite viewing surface 52. The operator assembly 50 is coupled to the rear of base 12 by hinges at 56 positioned at each side of the rearward edge thereof. When in a viewing operational mode, camera 10 establishes an optical path extending from its taking or objective lens system within exposure housing 20 to a mirror or specularly reflecting surface 60 fixed within the exposure chamber 36 to the inward side of rear wall 14, thence to the viewing surface 52 upwardly facing from operator assembly 50. Viewing surface 52 is configured having a texture and optical design facilitating the focusing of the image of a scene to be photographed. This image may be viewed by the camera operator through an optical entrance assembly 62 centered and mounted upon top wall 18. A configuration suited for viewing surface 52 is described and claimed in a copending U.S. Pat. application Ser. No. 83,030, filed Oct. 22, 1970, by Nathan Gold, entitled "Reflective Imaging Apparatus," and assigned in common herewith. Optical entrance assembly 62 and its related internal components are described in detail in a copending U.S. Pat. application Ser. No. 98,356 by James G. Baker, filed Dec. 15, 1970, entitled, "Reflex Camera and Viewing Device," and assigned in common herewith.

The components of camera 10 normally assume a configuration for operation in a viewing mode wherein focusing can be carried out by operator manipulation of focusing wheel 26. During a photographic cycle, however, the components are re-oriented to assume an exposure mode configuration. FIG. 1 of the drawings is arranged as such that the operator assembly 50 is illustrated in solid line fashion at its focusing mode orientation, while its alternate exposure mode orientation is shown in phantom at 50'. Assembly 50 is retained in its viewing mode orientation against ridge 46 of cassette 44 by a four-bar linkage shown generally at 64. Linkage 64 includes a first lever portion formed as part of hinge 56 which is pivotally connected at 66 with a draw-down link 68. Draw-down link 68, in turn, is pivotally connected at 70 to a crank linkage 72. Crank linkage 72 is coupled to a spring driving system at 74 as well as to a motor driven cocking mechanism through a drive crank 76. One end of a motor providing power for the latter cocking system is shown at 80. The four-bar linkage 64 as well as its related driving components are described in detail in a co-pending U.S. Pat. application Ser. No. 134,733, entitled, "Reflex Camera," by E. H. Land, I. Blinow and V. K. Eloranta, filed Apr. 16, 1971, and assigned in common herewith.

During a viewing mode of operation, the exposure control system of camera 10 provides for an open shutter condition with widest available aperture. Following the depression of start button 22, the exposure mechanism of the camera blocks the optical path and operator assembly 50 is spring driven from four-bar linkage 64 to rotatably rise into the position illustrated at 50' adjacent mirror 60 at rear wall 14. This maneuver serves to unblock the exposure plane outlined by ridge 46 of cassette 44 and, additionally, to introduce mirror surface 54 into the optical path of the camera at position 54'. In an exposure mode, the optical path of the camera 10 extends from the taking objective thereof within exposure housing 20 to mirror surface 54', thence to the uncovered exposure plane of the camera. Following the assumption by operator assembly 50 of its exposure mode orientation 50', the exposure mechanism of the camera cycles through an exposure interval, whereupon it again blocks the optical path of the camera to permit the operator assembly 50 to be driven from motor 80 and crank 76 into its viewing mode orientation. During this cocking maneuver, an exposed film unit is withdrawn from cassette 44 and introduced into a processing station shown generally at 92. Processing station 92 is formed of two pressure applying rolls, 94 and 96. These rolls are driven from motor 70 through a gear train, one component of which is shown as a drive gear 98. Gear 98 is meshed with a driven gear 100 coupled with upper roll 94. The details of the gear train, including gears 98 and 100 as well as their driving connection with motor 80, are described in detail in the above-noted application for United States Patent by E. H. Land et al.

From the foregoing, it will be apparent that automatic operation of the camera 10 requires an exposure mechanism including shutter and aperture control which must accommodate to the somewhat involved mechanical logic involved in converting back and forth between a viewing mode and an exposure mode of operation. For instance, at the commencement of an exposure cycle, the exposure mechanism of the camera must be opened to provide widest possible aperture. As the shutter release button 22 is depressed, the exposure mechanism must block the optical path while operator unit 50 rises under spring bias to its exposure mode orientation at 50'. The exposure control mechanism must then again open to expose an uppermost film unit at the exposure plane of the camera. This exposure preferably is carried out under a predetermined program relating optimum exposure interval and aperture values with scene light level. Alternately, the exposure mechanism must operate in a follow-focus manner in which aperture values are established in accordance with the light levels anticipated from flash unit 32. Following an exposure interval for both ambient and flash operation, the exposure mechanism must be held in its light blocking or closed position, while the operator unit 50 is driven to its downward position blocking the passage of light through the film frame 46 to the exposure plane of the camera. When the operator unit 50 is in this light blocking viewing mode position, the exposure mechanism must again be opened to establish maximum aperture.

While performing under the logic criteria outlined above involving alternate performance for ambient or daylight operation as well as for flash operation, any exposure control mechanism should be of a non-complex mechanical design suited to high-volume production techniques. The exposure control mechanism of the present invention meets such criteria.

Referring to FIGS. 2 and 3, the exposure mechanism is illustrated in closer detail. As shown generally at 104, the exposure mechanism is formed having two cooperatively moving shutter-aperture blades, 106 and 108, which ride transversely within supporting track 109 formed within exposure housing 20. Each of the blades, 106 and 108, is formed having a selectively shaped aperture opening, respectively depicted at 110 and 112, which are movable across the optical path of the camera 10 in the vicinity of the objective or taking lens positioned with respect to an aperture or optical path entrance at 114. Depending upon the position of blades 106 and 108, aperture openings 110 and 112 symmetrically overlap over the entrance 114 of the optical path of the camera 10 to define selectively varying aperture sizes. Each of the blades, 106 and 108, is additionally configured having a selectively configured and corresponding photocell sweep opening, respectively depicted at 118 and 120. Openings 118 and 120 are configured respectively in correspondence with the contours of aperture openings 110 and 112. The openings 118 and 120 move with mutual symmetry over a small fixed aperture 122 providing for a passage of light from the scene being photographed to the photosensing element of a light sensitive control circuit.

Blades 106 and 108 define a progression of apertures over opening 114 as a result of their connection with a walking beam as shown at 124. Walking beam 124 is formed having a centrally disposed driving hub 126 which is journaled for rotation over an upstanding stud 128 fixed, in turn, to exposure housing 20. Elongate slots as at 130 and 132 are formed in the outward tip portions of beam 124 for the purpose of providing connection with pins 134 and 136 extending, respectively, from blades 106 and 108. Thus interconnected, the blades 106 and 108 move simultaneously and in correspondence with each other to define a symmetrically configured variable aperture opening over the camera optical path 114 as well as over the photocell aperture 122. Elongate slots 130 and 132 serve the function of accommodating the horizontally restricted movement of blades 106 and 108 along a cord through the locus of rotation of the tips of beam 124. Beam 124 is biased by a spirally wound spring 138. The movable end of spring 138 is attached to pin 136 of blade 108, while its stationary end is affixed to a stud 140 extending from exposure housing 20. With this connection to spring 138, the exposure mechanism is biased for movement into a "normally open" orientation when in its "relaxation" mode of operation.

The exposure control system of camera 10 also includes an exposure mechanism electromagnetic drive, including a solenoid 144. Mounted within exposure housing 20 by bracket 146, solenoid 144 is of conventional design, having an internally disposed cylindrical plunger 148 which retracts inwardly into the body of the solenoid 144 upon energization thereof. Plunger 148 is connected with walking beam 124 by a flexible cable 150. One end of cable 150 is connected to a bolt 152 threadably inserted within the central portion of plunger 148. A lock nut 154 retains bolt 152 in appropriate position. The opposite end of cable 150 is connected by a bolt 156 to the outer periphery of driving hub 126 of walking beam 124. Outward travel of the plunger 148 resulting from tension exerted from spring 138 through cable 150 is limited by a stop portion 158 of bracket 146.

In its normal or relaxed condition, the exposure mechanism assumes the configuration of FIG. 2 wherein blades 106 and 108 define a maximum opening over aperture 114 as well as over photocell aperture 122. In this condition, solenoid 144 is not energized and walking beam 124 holds the blades 106 and 108 in the position shown by virtue of the rotational bias exerted by spring 138. Energization of solenoid 144 causes plunger 148 to rapidly withdraw into the body of solenoid 144. As a consequence, hub 126 is rotated from cable 150 and walking beam 124, in turn, is rotated into the orientation illustrated in FIG. 5. The extent of this rotation is limited by a contact pin 164 extending from exposure housing 20. In this orientation, entrance opening 114 of the taking lens optical path of the camera is completely closed. A subsequent de-energization of solenoid 144 releases plunger 148 and allows beam 124 to rotate under the bias exerted by spring 138. This rotation permits openings 110 and 112 of respective shutter blades 106 and 108 to define progressively enlarging apertures as they move toward a terminal position limited by a pin 162 (FIG. 2). Simultaneously with this movement, openings 118 and 120 define a correspondingly progressively enlarging aperture over the photocell opening at 122. When detection circuitry associated with the photocell located at opening 122 develops an appropriate exposure terminating signal, solenoid 144 will again be energized to retract plunger 148. A retraction of plunger 148 causes shutter blades 106 and 108 to resume the closed positions shown in FIG. 5. Following an interval required for the camera to re-assume its viewing mode orientation, the solenoid 144 is deenergized to permit blades 106 and 108 to assume the maximum aperture position of FIG. 2.

With the exposure control arrangement thus disclosed, for daylight or ambient illumination, dual exposure parameter control is achieved with relative simplicity while providing for a shutter operation within the process logic requirements of the form of single lens reflex camera described in connection with FIG. 1. The exposure mechanism further is capable of performing in follow-focus manner for flash illumination through the use of a small, relatively low-power electromagnetically driven assembly.

For flash operation, the exposure mechanism of the invention provides for aperture regulation in correspondence with the focus setting of the taking lens of the camera. The taking lens system of the camera 10 is mounted within an externally threaded cylindrical bezel assembly, the outer threaded periphery of which is shown at 170. A detailed description of such a lens mount is described in a copending U.S. Pat. application Ser. No. 101,745 by Rosario J. Messina, entitled "Adjustable Lens Mounting," filed Dec. 28, 1970, and assigned in common herewith. Bezel 170 is rotatable to provide objective lens focusing. Manual drive for this rotation is provided from the externally threaded focus adjusting wheel 26. Referring additionally to FIG. 3, driving connection between focus adjusting wheel 26 and bezel 170 is provided by an idler gear 172 mutually meshed therebetween. As is apparent, with the interconnection of bezel 170 and focus wheel 26, the rotational orientation of focus wheel 26 corresponds with the focus setting of the lens system within bezel 170. This rotational correspondence of focus wheel 26 is selectively and controllably introduced into the exposure mechanism through selective energization and adjustment of a second, follow-focus solenoid driven arrangement including a solenoid 174. Solenoid 174 is moved in correspondence with the focus setting of wheel 26 to positions at which it can intercept and arrest the rotation of walking beam 124 during its relaxation mode travel under the bias of spring 138. Accordingly, solenoid 174 is coupled through a bracket 176 to a rack and pinion assembly including rack 178 and a pinion gear 180. As illustrated in detail in FIGS. 3 and 4, rack 178 is slideably mounted upon a base plate 182 and bracket 184 fixed within exposure housing 20. The rearwardly extending portion of rack 178 is geared at 186 in conventional fashion to mesh appropriately with pinion 180. Pinion 180 is rotatably mounted within housing 20 so as to mesh with an inwardly facing internal ring gear 188 formed within the inwardly facing sides of focus wheel 26. Thus interconnected with focus wheel 26, solenoid 174 is movable laterally along the locus of travel of the upward side of walking beam 124 in correspondence with any given focus setting of wheel 26.

Follow-focus solenoid 174 is configured having a plunger 192 which is biased to retract inwardly away from the locus of travel of beam 124 by a spiral spring 194 wound thereabout and positioned between a rearward cap on plunger 192 and bracket 176. The forward end of plunger 192 is configured to form a detent as at 196.

When energized, solenoid 174 extends plunger 192 such that it intercepts and arrests the movement of walking beam 124. Interception is effected along one edge of a thin extension 200 of beam 124. Detent 196 is present to provide a capture function such that once the beam 124 is contacted by plunger 192, solenoid 174 may be de-energized while plunger 192 remains extended to arrest beam 124. During ambient operation of the exposure control system, solenoid 174 remains de-energized and spring 194 retains plunger 192 along with its detent tip 196 in retracted position such that no contact and resultant interference is made with the movement of walking beam 124. Accordingly, no interference is possible between the flash or follow-focus and ambient or daylight components of the exposure system.

During a photographic cycle in which flash illumination is utilized, the flash exposure control system is armed and a photographic cycle commences with the energization of solenoid 144 and the closure of blades 106 and 108 as shown in FIG. 5. When the blades 106 and 108 block the optical path at 114 and operator assembly 50 is moved into its exposure mode orientation as shown at 50' in FIG. 1, solenoid 144 is de-energized to release walking beam 124 for movement under the bias of spring 138. Prior to this de-energization, solenoid 174 is energized to cause plunger 192 to be extended into the path of travel of beam extension 200. Note that energization of solenoid 174 will take place as walking beam 124 is in its terminal position, extension 200 contacting pin 164. Accordingly, no interference is possible between the extended plunger 192 of energized solenoid 174 and walking beam 124. In accordance with normal ambient operation of the exposure mechanism, solenoid 144 is then de-energized to release walking beam 124 for movement under the bias of spring 138. This movement is limited, however, by the position of the extended plunger 192. When extension 200 contacts plunger 192, an aperture will be defined by blades 106 and 108 which corresponds with the position of solenoid 174, and, accordingly, with the focal setting of taking lens of the camera 10. Following an interval of time sufficient for walking beam 124 to move from its terminal position contacting pin 164 to its terminal position contacting pin 162, solenoid 174 is de-energized and a flashlamp simultaneously is fired. De-energization of solenoid 174 does not release the contact between plunger 192 and beam extension 200 with this de-energization inasmuch as detent 196 will have captured extension 200. A typical intermediate aperture setting provided by the system is illustrated in FIG. 6, while the above-described capturing of the plunger 192 through the use of detnet 196 is illustrated in more detail in connection with FIG. 4.

An exposure is terminated upon the re-energization of solenoid 144 which causes plunger 148 to be retracted and beam 124 to be rotated from cable 150 to drive blades 106 and 108 to the closed position shown in FIG. 5. As extension 200 is rotated toward pin 164, the capture between detent 196 and extension 200 is released. Following this disengagement, plunger 192 of solenoid 174 is permitted to return to its retracted position out of contact with beam 124 as a result of bias exerted from spring 194. During the ensuing closed status of the exposure mechanism, operator assembly 50 is moved from its exposure mode orientation 50' into its viewing mode orientation as shown in FIG. 1 at 50.

Note that with the arrangement thus described the exposure mechanism of the invention is capable of operating in either a follow-focus or ambient mode using a simple mechanism and without interference between the two exposure regulating systems.

Figure 7:
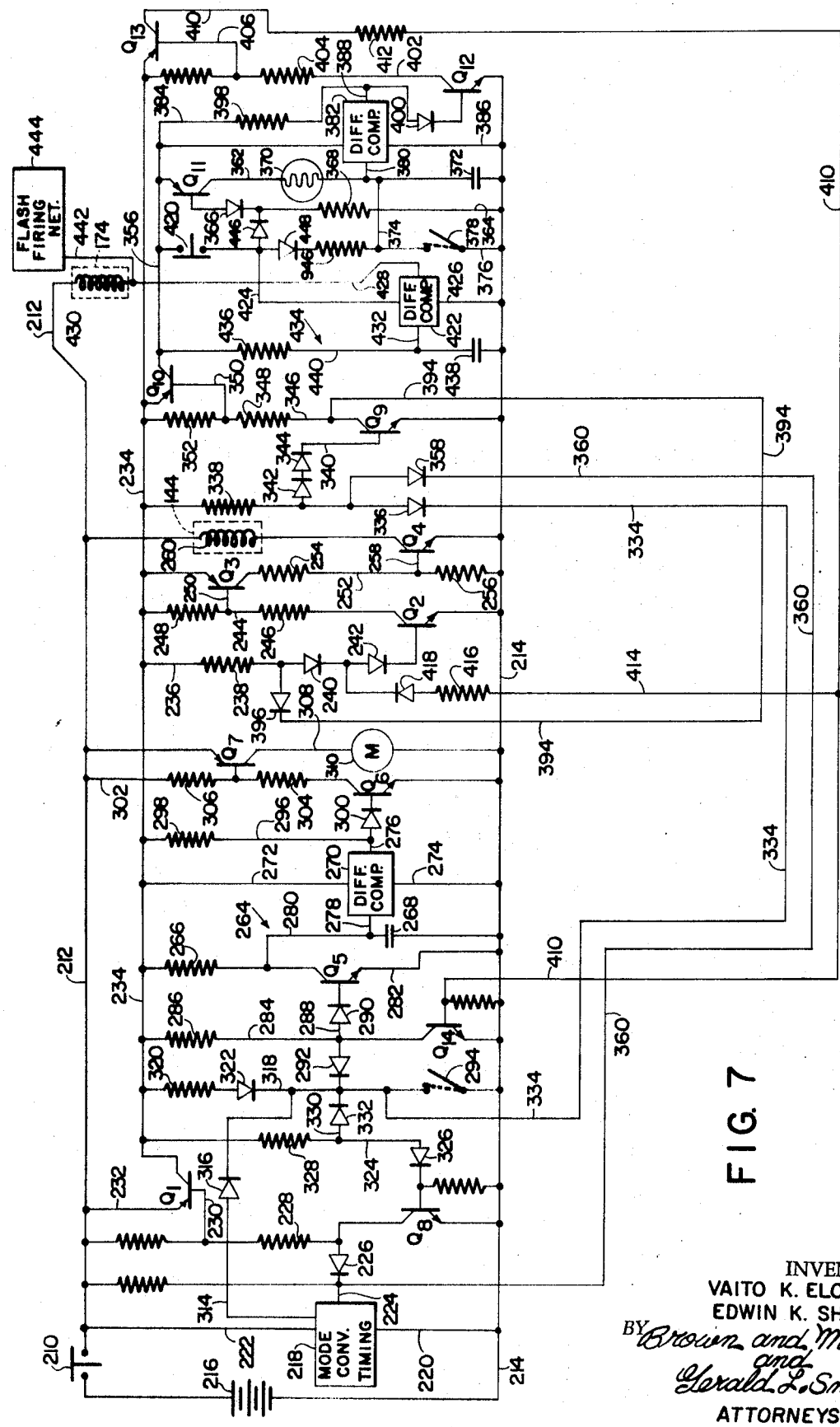
FIG. 7 is a circuit diagram illustrating a control arrangement for use with the exposure control system of the invention.

Referring to FIG. 7, a control circuit for operating the dual mode exposure control system of the invention is described. A photographic cycle is commenced with the depression of "start" button 22 to close a switch 210. When closed, switch 210 energizes main power lines 212 and 214 from a battery 216. Energization of lines 212 and 214 initially enables a mode conversion timing function 218 from along lines 220 and 222. Conversion timing function 218 includes an R-C timing network and triggering circuit such as a differential comparator and is activated in conjunction with the movement of operator assembly 50. In this regard, the output 224 of timing function 218 remains at the ground potential of power line 214 until such time as the operator assembly 50 reaches its exposure mode configuration. For purposes of facilitating the description to follow, when the outputs of such triggering systems or comparators are at the ground reference potential of line 214, they are referred to as "low" and when they assume the voltage status of source line 212, they are referred to as being "high." Output 224 is coupled through a diode 226, bias resistor 228 and line 230 to the base electrode of a PNP transistor $Q_1$. The emitter of transistor $Q_1$ is coupled through a line 232 to power line 212 and its collector is connected with a secondary or logic power line 234. The "low" status at output 224 of mode conversion timing function 218 at the commencement of a photographic cycle serves to forward bias the base-emitter junction of transistor $Q_1$, thereby powering logic power line 234 from power line 212.

Energization of logic power line 234 from transistor $Q_1$ serves initially to energize the exposure mechanism solenoid 144 by forward biasing the base-emitter junction of an NPN transistor $Q_2$. Forward biasing current is directed to the base of transistor $Q_2$ from line 234 through a line 236, bias resistor 238, diode 240 and diode 242. The emitter of transistor $Q_2$ is coupled to reference power line 214, while its collector is coupled to power line 234 through line 244 including resistors 246 and 248. An "on" status at transistor $Q_2$, in turn, forward biases the base-emitter junction of a PNP transistor $Q_3$, the base of which communicates with reference line 214 through transistor $Q_2$, resistor 246, line 244 and line 250. The emitter of transistor $Q_3$ is connected with power line 234 and its collector is connected along a line 252 through resistors 254 and 256 to ground reference line 214. Conduction through line 252, in turn, forward biases the base-emitter junction of an NPN transistor $Q_4$, the base of which is connected to line 252 through line 258. The emitter of transistor $Q_4$ is coupled to ground reference line 214, while its collector is connected through the winding 260 of solenoid 144 to main power line 212. Solenoid 144 is depicted functionally in FIG. 7 by a dashed boundary.

The time interval required for solenoid 144 to cause exposure mechanism 104 to close and thereby secure exposure chamber 36 is followed by an R-C timing network 264 comprised of resistor 266 and a capacitor 268 operating in conjunction with a differential comparator 270. Differential comparator 270 is coupled to logic power line 234 from along line 272, and to ground reference line 214 from along line 274. The comparator 270 is of conventional design, operating as a non-inverting amplifier. The output of comparator 270 at line 276 may assume a "high" or "low" status in response to the receipt at its input line 278 of a voltage signal, respectively, above or below a predetermined reference level. This signal is derived from the R-C timing network 264. Input 278 of differential comparator 270 is coupled to line 280 at a point within network 264 intermediate resistor 266 and capacitor 268.

Timing network 264 is designed having a time constant selected to reach the trigger level of differential comparator 270 in a period of time corresponding to the time required to assure that the blades 106 and 108 of exposure mechanism 104 have moved from a fully open position to a fully closed position. During this timing interval, the output at line 276 assumes a "low" status. Timing operation of the network 264 is permitted as a result of the "off" status of an NPN transistor $Q_5$. The collector of transistor $Q_5$ is coupled to line 280 intermediate resistor 266 and capacitor 268, and its emitter is connected through line 282 to ground reference line 214. Thus connected, transistor $Q_5$ is used to selectively shunt capacitor 268 and reset network 264. To forward bias transistor $Q_5$ and thereby shunt capacitor 268, biasing current is supplied to the base thereof from logic power line 234 through line 284, bias resistor 286, line 288 and diode 290. At the commencement of an exposure interval, however, this current is diverted through a diode 292 across a closed switch 294 to ground reference line 214. Switch 294 is a phase cycle switch which is actuated simultaneously with the movement of operator assembly 50 into or out of its viewing mode position. Until operator assembly 50 is released for movement from its cocked position, switch 294 remains closed.

When timing network 264 achieves the threshold or reference voltage of comparator 270 following a period of time adequate to permit solenoid 144 to fully close blades 106 and 108, the output at line 276 goes "high." A "high" output at line 276 terminates a clamping current flow from logic power line 234 into line 296, bias resistor 298 and output line 276 of differential comparator 270. As a result, current now passes through diode 300 to forward bias the base-emitter junction of an NPN transistor $Q_6$. The emitter of transistor $Q_6$ is connected with power reference line 214 and its collector is connected with power line 212 through a line 302 including bias resistors 304 and 306. As current is conducted through transistor $Q_6$, the base-emitter junction of a PNP transistor $Q_7$ is forward biased. The base of transistor $Q_7$ is coupled to line 302 intermediate resistors 304 and 306, while its emitter is coupled to power line 212. The collector of transistor $Q_7$ is coupled along a line 308 which, in turn, is connected to the terminals of a d.c. motor 310 and with ground reference line 214. Motor 310 corresponds with motor 80 of camera 10. With the forward biasing of transistor $Q_7$, motor 310 is energized briefly and, through an appropriate latching mechanism, releases operator assembly 50 for movement under spring drive to its exposure mode position. An appropriate mechanism for providing such a motor actuated latching function is described in detail in the above-referenced application for U.S. Pat. by E. H. Land et al. As the operator assembly 50 leaves its cocked orientation, switch 294 is opened to de-energize motor 310 and activate mode conversion timing function 218.

This initial de-energization of motor 310 is carried out by the re-assertion of a forward biasing current flow along line 284, through bias resistor 286, line 288 and diode 292 to the base of NPN transistor $Q_5$. With the opening of the phase cycle switch 294, this forward biasing current is no longer diverted through diode 292 and the switch 294. As a consequence, timing capacitor 268 of timing network 264 is shunted to ground reference line 214 through line 282. With the shunting of capacitor 268, the output at line 276 of differential comparator 270 goes "low" and current at line 296 is diverted from the base of transistor $Q_6$. The diverting path includes output line 276 and the comparator 270. As a consequence, the forward bias exerted at transistor $Q_6$ is removed and conduction through line 302 is terminated. As a result, the forward bias at transistor $Q_7$ is removed and motor 310 is de-energized.

Early in a photographic cycle, while switch 294 is closed, the timing operation of mode conversion timing function 218 is restrained by a current diverting clamp including line 314, diode 316, line 318 and switch 294. Line 318 is connected between logic power line 234 and reference level power line 214 and includes a current limiting resistor 320 and diode 322 as well as switch 294. With the opening of switch 294, line 314 no longer communicates with ground reference line 214 through line 318, and function 218 is permitted to commence timing the period required for operator assembly 50 to move from its viewing mode orientation into its exposure mode orientation.

An opening of switch 294 also permits the forward biasing of the base-emitter junction of an NPN transistor $Q_8$. The base of transistor $Q_8$ is connected with logic power line 234 through a line 324 including diode 326 and a bias resistor 328. Current flow through line 324 is diverted through line 330 and diode 332 into line 318 whenever switch 294 is closed. Accordingly, with the closure of switch 294, transistor $Q_8$ is "off." The emitter of transistor $Q_8$ is coupled to ground reference line 214, while its collector is connected through resistor 228 and line 230 to the base of transistor $Q_1$. A latching arrangement is provided thereby which serves to hold transistor $Q_1$ "on" as long as switch 294 remains open during a photographic cycle.

The opening of switch 294 de-activates another clamping arrangement including line 334 which extends through a diode 336 and bias resistor 338 to logic power line 234. Coupled to line 334 at a point intermediate diode 336 and bias resistor 338 is a line 340 incorporating diodes 342 and 344 and extending to the base of an NPN transistor $Q_9$. The emitter of transistor $Q_9$ is connected to ground reference line 214 and its collector is connected through line 346, bias resistor 348 and line 350 to the base of a PNP transistor $Q_{10}$. A resistor 352 is connected in line 346 between line 350 and logic power line 234 to provide "turn-off" bias at transistor $Q_{10}$. The emitter of transistor $Q_{10}$ is connected to logic power line 234 and its collector is connected with an exposure function power line 356.

Transistors $Q_9$ and $Q_{10}$ being thus interconnected, when transistor $Q_9$ is forward biased by current from line 340 through diodes 342 and 344, conduction to ground line 214 will be completed and the base-emitter junction of transistor $Q_{10}$ will be forward biased. However, when switch 294 is closed, current otherwise forward biasing transistor $Q_9$ is diverted along the clamping arrangement including line 334 and switch 294. When switch 294 is opened with the elevation of operator assembly 50, another clamping arrangement including diode 358 and line 360 provides a current diverting path to the output 224 of mode conversion timing function 218 in order to retain transistor $Q_9$ in a reverse biased state while timing function 218 is timing out the period required for operator assembly 50 to reach its exposure mode orientation. During this period, the output at line 224 will be "low" and, as a consequence, clamping line 360 is permitted to provide a diverting function.

When timing function 218 has timed out the movement of operator assembly 50, output line 224 assumes a "high" status, thereby terminating the flow of current through line 360. As a consequence, biasing current is introduced from line 234 through line 334 to forward bias transistor $Q_9$. An "on" status at transistor $Q_9$ promotes a corresponding "on" status at transistor $Q_{10}$, thereby energizing line 356 from line 234.

During daylight or ambient mode operation of the camera, energization of line 356 arms a light sensitive exposure control circuit. This circuit includes a PNP transistor $Q_{11}$, the collector and emitter terminals of which are coupled within line 362 between exposure function power line 356 and ground reference line 214. The base of transistor $Q_{11}$ is connected by a line 364 through diode 366 and bias resistor 368 to power line 214. Thus connected, with the energization of line 356, transistor $Q_{11}$ is forward biased to activate a light sensitive R-C timing network within line 362. This network includes a light sensitive resistor or photocell 370 and a timing capacitor 372. A shunt including line 374, line 376, and switch 378 is connected across capacitor 372. Switch 378 is opened at least simultaneously with the commencement of opening movements of blades 106 and 108 of mechanism 104. Connected between photocell 370 and capacitor 372 is the input 380 of a differential comparator 382. Coupled between power line 356 and reference line 214 respectively, from lines 384 and 386, the output 388 of comparator 382 is normally "low". This "low" output at line 388 remains until a voltage of predetermined threshold level is developed at its input 380 by the exposure regulating control function of the camera.

An exposure interval is commenced with the simultaneous energization of exposure function power line 356 and de-energization of the winding 260 of solenoid 144. To carry out the latter de-energization, a forward biasing of transistor $Q_9$ provides for the activation of a current diverting line 394 extending from line 236, through diode 396 and to the collector side of transistor $Q_9$. When activated, line 394 serves to divert biasing current passing through line 236 and bias resistor 238 from the base of transistor $Q_2$. As a result, transistor $Q_2$ is reverse biased into an "off" status simultaneously with the energization of exposure function power line 356. When transistor $Q_2$ is reverse biased, transistors $Q_3$ and $Q_4$ correspondingly are reverse biased. As resistor $Q_4$ if turned "off", winding 260 of solenoid 144 is de-energized to release walking beam 124 for movement under the bias of spring 138. Blades 106 and 108 of exposure mechanism 104 commence to open.

During the ensuing exposure interval, the output at line 388 of differential comparator 382 remains "low" until the timing network including photocell 370 and timing capacitor 372 develops a voltage level at input 380 corresponding to the predetermined threshold triggering level of comparator 382. When this threshold level is reached, comparator 382 triggers to rapidly change the output at line 388 to a "high" status. During the interval when the output at line 388 is "low", current is permitted to pass from line 356 through a bias resistor 398 to communicate with ground level through differential comparator 382 at line 386. When the output at line 388 goes "high" at the termination of an exposure interval, current passes from line 356 through bias resistor 398 and diode 400 to the base of NPN transistor $Q_{12}$. The emitter of transistor $Q_{12}$ is connected to ground reference line 214 and its collector is connected through line 402, bias resistor 404 and line 406 to the base of a PNP transistor $Q_{13}$. The emitter of transistor $Q_{13}$ is connected with logic power line 234 and its collector is connected to line 410. Line 410 is connected through a bias resistor 412 to the base of an NPN transistor $Q_{14}$ which functions to reactivate timing network 264. Line 410 additionally is coupled through line 414, bias resistor 416 and a diode 418 to line 236 leading, in turn, to the base of transistor $Q_2$.

An exposure terminating "high" status at output 388 of differential comparator 382 causes the forward biasing of transistor $Q_{12}$. When so forward biased, transistor $Q_{12}$ draws the base-emitter junction of transistor $Q_{13}$ into a forward biased condition. As a consequence, current flows from line 234 through line 410. Line 410, in turn, energizes line 414 to cause a forward biasing of the base-emitter junction of transistor $Q_2$. As noted earlier, when transistor $Q_2$ is forward biased, transistors $Q_3$ and $Q_4$, correspondingly, are forward biased to energize the winding 260 of solenoid 144. This energization causes exposure mechanism 104 to close blades 106 and 108 to terminate an exposure.

Turning to operation of the exposure control system in a flash mode as opposed to an ambient mode, with the insertion of a flash unit as at 32 within mounting 30, a switch as at 420 is closed. Closure of switch 420 permits a differential comparator 422 to be energized from exposure function power line 356 and reference line 214, respectively, through lines 424 and 426. The output of differential comparator 422 is connected with a line 428 through the winding 430 of a solenoid to main power line 212. Winding 430 corresponds with the winding of a follow-focus solenoid 174 described in connection with FIGS. 2 - 6. Accordingly, the solenoid is again represented in the present figure as a dashed boundary 174. The output of differential comparator 422 at line 428 is normally "low" and, as a consequence, winding 430 is energized coincidently with the energization of exposure function power line 356 and simultaneous activation of comparator 422.

The input at line 432 of comparator 422 is connected to an R-C timing network 434. Network 434 includes a resistor 436 and timing capacitor 438 coupled within line 440 between exposure function power line 356 and ground reference line 214. Network 434 is configured having a time constant corresponding at least with the amount of time required for blades 106 and 108 of exposure mechanism 104 to be driven under the bias of spring 138 from their fully closed position to their fully open position. Following such time-out, the voltage level at input 432 reaches the triggering level of differential comparator 422. When this threshold level is reached, the comparator 422 triggers to rapidly change the output at line 428 to a "high" status. As a result, winding 430 of solenoid 174 is de-energized. As noted earlier in connection with FIG. 4, the plunger 192 of solenoid 174 remains extended at this point within the photographic cycle, inasmuch as a detent 196 in its tip engages with and is retained at the extension 200 of walking beam 124. Consequently, beam 124 retains blades 106 and 108 in the predetermined aperture position selected for flash firing.

The de-energization of winding 430 of solenoid 174 develops a "spike" or inductive surge in line 428 which is intercepted at a line 442 and introduced to a flash firing network 444. Network 444, in turn, causes the firing of one lamp within the flash-package 32. A circuit suited for the function of flash firing network 444 is described in and claimed in a copending application for U.S. Pat. by J. P. Burgarella et al., Ser. No. 844,470, filed July 24, 1969 and assigned in common herewith.

During flash mode operation of the exposure control system, closure of switch 420 also diverts current from line 356 through a diode 446 and through line 364. This diversion lowers the requisite voltage drop required to retain the base-emitter junction of transistor $Q_{11}$ in a forward biased state. Transistor $Q_{11}$, therefore, turns "off" to de-energize line 362 and effectively remove photocell 370 from the control circuit. The resistance represented by photocell 370 is substituted, however, by timing resistor 946 coupled through a diode 448 to line 424. The timing network operating in conjunction with the input 380 of differential comparator 382 now includes resistor 446, line 374 and capacitor 372. The time constant of this flash mode timing arrangement is selected in correspondence with a typical predetermined duration of light output of a flash source. Additionally, the timing period of the network is selected to be lengthier than that of network 434 to prevent a "race" condition between the energization of solenoid winding 430 and de-energization of winding 260 of solenoid 144. Following an appropriate predetermined fixed time-out of the flash mode exposure interval timing network, the voltage level at input 380 of differential comparator 382 reaches its predetermined triggering value and the output of the comparator 382 at line 388 goes "high." A "high" output at line 388 causes transistors $Q_{12}$ and $Q_{13}$ to be forward biased, in turn, causing the forward biasing of transistors $Q_2$, $Q_3$ and $Q_4$ to re-energize the winding 260 of solenoid 144.

Returning to FIGS. 2 - 6, as solenoid 144 causes beam 124 to rotate against the bias of spring 138, the capture condition between detent 196 of plunger 192 and extension 200 of beam 124 is eliminated and plunger 192 returns to its retracted position under the bias of spring 194.

At the end of an exposure interval, the energized status of line 410 causes a forward biasing of the base-emitter junction of transistor $Q_{14}$. The emitter of transistor $Q_{14}$ is connected to ground reference power line 214 and its collector is connected to line 284. When current from line 410 forward biases transistor $Q_{14}$, current from line 284 is diverted from line 288 to line 214 and a forward bias at transistor $Q_5$ is removed. As a result, the shunt about timing capacitor 268 is removed and timing network 264 commences to time-out the period required for blades 106 and 108 of exposure mechanism 104 to close. The output at line 276 of differential comparator 270 remains "low" until this exposure mechanism timing period terminates, at which time it assumes a "high" status. While the output at line 276 remains "high", the base-emitter junction of transistor $Q_6$ is forward biased from along line 296 and diode 300. A forward biased condition at transistor $Q_6$, in turn, causes transistor $Q_7$ to be forward biased, thereby causing motor 310 to be re-energized from line 308. This second energization of motor 310 is utilized to cock operator assembly 50 by driving it to its viewing mode position as well as to power processing station 92. As the operator assembly 50 reaches its viewing mode position, switch 294 is again closed. When switch 294 closes, forward biasing current otherwise directed to transistor $Q_8$ is diverted through line 330, diode 332 and line 318 to reference power line 214. When transistor $Q_8$ thus is reverse biased, transistor $Q_1$ is reverse biased to de-energize logic power line 234. The de-energization of line 234 shuts down the entire circuit to terminate a photographic cycle.

Since certain changes may be made in the above described full exposure control system without departing from a scope of the invention herein, it is intended that all matter contained in the description thereof or shown in the accompanying drawings shall be interpreted as illustrative and not in a limiting sense.

What is claimed is:

1. An exposure control system for photographic apparatus comprising:
   means defining an optical path for transmitting light from a subject to be photographed onto a photographic material;
   means for energizing a source of artificial light when activated to illuminate said subject in accordance with a given illumination factor;
   exposure regulator means having a driven mode effective to block the passage of light along said optical path and a relaxation mode effective to progressively unblock said path to derive a predetermined variation of aperture value thereover;
   electromagnetic means adjustable in accordance with said illumination factor and selectively energizable to arrest the said aperture value variation of said exposure regulator means to establish a select exposure aperture; and
   control means for causing said exposure regulator means to assume said driven mode at the commencement of a photographic cycle of said apparatus, thence to energize said electromagnetic means, thence to cause said exposure regulator means to assume said relaxation mode,
   thence to activate said means for energizing said source of artificial light, and
   thence to cause said exposure regulator means to re-assume said driven mode.

2. The exposure control system of claim 1 wherein: said exposure regulator means is movable along given locus of travel when in said relaxation mode; and said electromagnetic means is operative, when energized, to position a stop within said locus of travel to arrest said exposure regulator means.

3. The exposure control system of claim 2 wherein said electromagnetic means includes a solenoid energizable to position said stop within said locus of travel.

4. The exposure control system of claim 2 in which said electromagnetic means stop and said exposure regulator means are configured to provide mutual mechanical engagement when said exposure regulator means is arrested during said relaxation mode and to retain said engagement so that said stop remains within said locus of travel in the presence of a de-energization of said electromagnetic means subsequent to said engagement.

5. The exposure control system of claim 4 in which said electromagnetic means stop and said exposure regulator means are operative to disengage subsequent to said mechanical engagement when said exposure regulator means is caused to re-assume said driven mode.

6. The exposure control system of claim 4 in which said electromagnetic means includes means for retracting said stop from said position from within said locus of travel when said electromagnetic means is de-energized and said exposure regulator means is caused to re-assume said driven mode.

7. The exposure control system of claim 4 wherein: said means defining said optical path includes a taking lens adjustably movable to focus the image of said subject upon said photographic material; and said electromagnetic means is adjustable in correspondence with said taking lens focusing adjustment.

8. The exposure control system of claim 1 in which: said exposure regulator means includes blade means movable toward one terminal position during said driven mode and toward another terminal position during said relaxation mode; and
   said control means is operative to energize said electromagnetic means only when said blade means has attained said driven mode terminal position.

9. The exposure control system of claim 8 in which said control means is operative to activate said source of artificial light only following an interval of time commencing with said assumption of said relaxation mode and sufficient for said blade means to attain said relaxation mode terminal position.

10. A range responsive exposure control system for photographic apparatus comprising:
    means defining an optical path;
    exposure regulator means energizable to move in a first direction to a terminal position for occluding the passage of light along said optical path, and subsequently de-energizable to move along a given locus of travel away from said terminal position for progressively varying the aperture value of said optical path;
    solenoid driven means adjustable and energizable for selectively positioning a stop within the said locus of travel of said regulator means; and
    control means responsive to the range of a given photographic subject for selectively adjusting and energizing said solenoid means to arrest said exposure regulator means during said movement along said locus of travel to establish an aperture value corresponding at least in part to said range, said solenoid means energization being carried out subsequent to said movement of said exposure regulator means in said first direction into said terminal position and prior to said movement away from said terminal position.

11. The exposure control system of claim 10 wherein said control means includes means for igniting a flash lamp when said aperture value is established.

12. The exposure control system of claim 10 wherein said solenoid means includes means for retracting said stop from said position within said locus of travel when said solenoid means is de-energized and said exposure regulator means is moved in said first direction.

13. The exposure control system of claim 10 wherein: said means defining an optical path includes a taking lens adjustively movable to focus the image of a photographic subject at an exposure plane; and said control means is responsive to said adjustive movement to selectively position said solenoid driven means stop within said locus of travel.

14. The exposure control system of claim 10 wherein said solenoid means stop and said exposure regulator means are mutually configured to establish a mechanical capture therebetween subsequent to said arrest and when said exposure regulator means is de-energized.

15. The exposure control system of claim 14 wherein said solenoid means stop and said exposure regulator means are mutually configured to disengage from said mechanical capture when said exposure regulator means is moved in said first direction toward said terminal position.

16. An exposure control system for photographic apparatus comprising:
light source means for activating a source of artificial light to illuminate a photographic subject remotely positioned therefrom;
means defining an optical path for focusing an image of said subject at an exposure plane;
exposure mechanism means movable during a photographic cycle toward an open terminal position to define a progressive variation of aperture values over said optical path and into a closed terminal position blocking the passage of light along said optical path;
drive means actuable to selectively move said exposure mechanism between said terminal positions;
electromagnetically driven means selectively energizable and adjustable to arrest the said movement of said exposure mechanism means; and
control means operative to actuate said drive means to move said exposure mechanism means into said closed terminal position at the commencement of a said photographic cycle,
thence to energize said electromagnetically driven means,
thence to actuate said drive means to move said exposure mechanism means toward said open terminal position,
thence to de-energize said electromagnetically driven means, and
thence to actuate said drive means to move said exposure mechanism means into said closed terminal position.

17. The exposure control system of claim 16 in which:
said drive means includes spring means for biasing said exposure mechanism means to move toward said open terminal position.

18. The exposure control system of claim 16 wherein:
said drive means is operative to move said exposure mechanism means from said closed terminal position into said open terminal position within a predetermined interval of time; and
said control means is operative to de-energize said electromagnetically driven means following a period of time commencing with said actuation causing said movement of said exposure mechanism means toward said open terminal position and extending at least as long as said predetermined interval.

19. The exposure control system of claim 18 wherein:
said drive means includes spring means for biasing said exposure mechanism means to move toward said open terminal position.

20. The exposure control system of claim 16 wherein:
said exposure mechanism means is movable along a given locus of travel toward said open terminal position; and
said electromagnetically driven means is energizable to position a stop within said locus of travel to arrest said exposure mechanism means to define said select aperture value.

21. The exposure control system of claim 20 wherein said electromagnetically driven means includes a solenoid energizable to position said stop within said locus of travel.

22. The exposure control system of claim 20 in which:
said electromagnetically driven means includes a solenoid energizable to position said stop within said locus of travel of said exposure mechanism means; and
said control means is operative to de-energize said solenoid a select period of time following said actuation of said drive means to move said exposure mechanism means toward said open terminal position and to activate said light source means in response to said de-energization.

23. An exposure control system for a single lens reflex camera having a viewing mode permitting the viewing of the image of a scene before and after an exposure, and an exposure mode for exposing photosensitive material, comprising:
means defining an optical path for exposing said photosensitive material at an exposure plane to light from said scene;
exposure mechanism means movable toward an open terminal position to define a time dependent progressive variation of exposure aperture values over said optical path, and movable into a closed terminal position blocking the passage of light along said optical path;
spring means for biasing said exposure mechanism means to move toward said open terminal position;
drive means energizable to cause said exposure mechanism means to move into said closed terminal position;
electromagnetic means energizable and adjustable to arrest the said movement of said exposure mechanism means under said spring means bias to establish a select exposure aperture value over said optical path corresponding with the level of illumination anticipated from an artificial light source;
reflex operator means actuable to move between one position blocking the exposure of said photosensitive material when said camera is in said viewing mode and another position permitting the exposure of said photosensitive material when said camera is in said exposure mode; and
control means operative to energize said drive means to move said exposure mechanism means into said closed terminal position at the commencement of a said photographic cycle,
thence to actuate said reflex operator means to move into said other position and to energize said electromagnetic means,
thence to initially de-energize said drive means to cause said exposure mechanism means movement from said closed terminal position under said spring means bias, thence to activate said artificial light source after said select exposure aperture is established, thence to energize said drive means to move said exposure mechanism means into said closed terminal position, thence to actuate said reflex operator means to move into said one position, and thence to de-energize said drive means to cause said exposure mechanism means movement from said closed terminal position under said spring means bias.

24. The exposure control system of claim 23 in which said control means is operative to activate said artificial light source in response to a de-energization of said electromagnetic means.

25. The exposure control system of claim 23 wherein:
said exposure mechanism means is movable along a given locus of travel toward said open terminal position; and
said electromagnetic means is energizable to position a stop within said locus of travel to arrest said exposure mechanism means to define said select exposure aperture value.

26. The exposure control system of claim 25 wherein:
said drive means is operative to move said exposure mechanism means from said closed terminal position into said open terminal position within a predetermined interval of time; and
said control means is operative to de-energize said electromagnetic means following a period of time commencing with the said initial de-energization of said drive means and extending at least as long as said predetermined interval.

27. The exposure control system of claim 25 wherein said electromagnetic means includes a solenoid energizable to position said stop within said locus of travel.

28. The exposure control mechanism of claim 27 in which said electromagnetic means stop and said exposure mechanism means are mutually configured to establish a mechanical capture therebetween subsequent to said arrest and when said exposure mechanism means is de-energized.

29. The exposure control system of claim 28 in which said electromagnetic means stop and said exposure mechanism means are operative to disengage from said mechanical capture when said exposure mechanism means is moved by said drive means toward said closed terminal position.

30. The exposure control system of claim 29 in which said electromagnetic means includes means for retracting said stop from said position within said locus of travel when said electromagnetic means is de-energized and said exposure mechanism means is moved toward said closed terminal position.

31. The exposure control system of claim 30 wherein:
said means defining an optical path includes a taking lens adjustable to focus the image of said scene at said exposure plane; and
said electromagnetic means ia adjustable in correspondence with focus adjustment of the said taking lens.

32. An exposure control system for photographic apparatus operative in an ambient mode responsive to the light level of a scene and in flash mode responsive to the level of flash lamp illumination anticipated at said scene comprising:

means defining an optical path for exposing a photosensitive material;

exposure mechanism means movable toward an open terminal position to define a time dependent progressive variation of exposure aperture values over said optical path, and movable into a closed terminal position blocking the passage of light along said optical path;

means for biasing said exposure mechanism means to move toward said open terminal position;

electromagnetic drive means energizable to cause said exposure mechanism means to assume said closed terminal position, de-energizable to cause said movement under said bias from said closed terminal position toward said open terminal position to initiate an exposure and, subsequently, energizable to move said exposure mechanism means into said closed terminal position to terminate said exposure;

electromagnetically driven means energizable and adjustable to arrest the said movement of said exposure mechanism means under said bias to establish a select exposure aperture value over said optical path corresponding with said anticipated level of flash lamp illumination;

switch means actuable to cause said exposure control system to operate in said flash mode; and control circuit means for selectively energizing and de-energizing said electromagnetic drive means and including:

light sensitive circuit means responsive during a said ambient mode exposure to said progressive variation of said exposure apertures and to the level of said scene light in accordance with the sensitometric properties of said photosensitive material for controlling the said energization of said electromagnetic drive means to cause said exposure termination; and flash mode circuit means operative only in response to actuation of said switch means for energizing said electromagnetically driven means to establish said select exposure aperture, for de-activating said scene light responsiveness of said light sensitive circuit means and for controlling the said energization of said electromagnetic drive means to cause said exposure termination following illumination of said scene from such flash lamp.

33. The exposure control system of claim 32 wherein said flash mode circuit means is operative to energize said electromagnetic drive means to cause said exposure termination a predetermined fixed interval of time following the said exposure initiating de-energization thereof.

34. The exposure control system of claim 32 wherein said means defining an optical path includes a taking lens adjustable to focus the image of said scene upon said photosensitive material; and said electromagnetically driven means is automatically adjustable in correspondence with the adjustment of said taking lens.

35. The exposure control system of claim 32 wherein:
said exposure mechanism means is movable along a given locus of travel toward said open terminal position; and
said electromagnetically driven means is operative in response to said energization to position a stop within said locus of travel to arrest said exposure mechanism means to establish said select exposure aperture.

36. The exposure control system of claim 35 wherein said stop and said exposure mechanism means are mutually configured to establish a mechanical capture therebetween subsequent to said arrest and when said exposure mechanism means is moved under said bias.

37. The exposure control system of claim 35 wherein said stop and said exposure mechanism means are mutually configured to engage in a manner establishing a mechanical capture when said exposure mechanism means is arrested during said movement under said bias, and to disengage when said exposure mechanism means is moved toward said closed terminal position to terminate a said exposure.

38. The exposure control system of claim 37 in which said electromagnetically driven means includes means for retracting said stop from said position within said locus of travel when said electromagnetically driven means is de-energized and said exposure mechanism means is moved toward said closed terminal position.

39. The exposure control system of claim 37 in which:
said biasing means is operative to move said exposure mechanism means between said terminal positions within a predetermined interval of time; and
said flash mode circuit means is operative to energize said electromagnetically driven means prior to said movement of said exposure mechanism means under said bias and to de-energize said electromagnetically driven means following a time delay commencing with the de-energization of said electromagnetic drive means and extending at least as long as said predetermined interval.

40. The exposure control system of claim 39 wherein said flash mode circuit means is operative to cause illumination by such a flash lamp in response to an inductive pulse resulting from the de-energization of said electromagnetically driven means.

41. The exposure control system of claim 39 wherein said flash mode circuit means is operative to energize said electromagnetic drive means to cause said exposure termination a predetermined fixed interval of time following the said exposure initiating de-energization thereof, said predetermined fixed interval being selected to be longer in duration than said electromagnetically driven means de-energization time delay.

42. An exposure control system for photographic apparatus comprising:
means defining an optical path for transmitting light from a subject to be photographed onto a photographic material;
means for energizing a source of artificial light when activated to illuminate said subject in accordance with a given illumination factor;
exposure regulator means having a driven mode effective to block the passage of light along said optical path and a relaxation mode effective to progressively unblock said path to derive a predetermined aperture variation thereover;
electromagnetic means adjustable in accordance with said illumination factor and energizable to arrest the aperture variation of said exposure regulator means to establish a select exposure aperture; and
control means for selectively activating said means for energizing said source of light and operative to cause said exposure regulator means to assume said driven mode at the commencement of a photographic cycle of said apparatus,
thence to energize said electromagnetic means,
thence to cause said exposure regulator means to assume said relaxation mode,
thence to de-energize said electromagnetic means, and
thence to cause said exposure regulator means to assume said driven mode.

43. The exposure control system of claim 1 in which said control means is operative to de-energize said electromagnetic means at the termination of a predetermined interval following the said assumption of said relaxation mode by said exposure regulator means.

44. The exposure control system of claim 42 in which said control means is operative to activate said means for energizing said source of artificial light in response to the said de-energization of said electromagnetic means.

45. The exposure control system of claim 43 in which said control means is operative to activate said means for energizing said source of artificial light in response to said electromagnetic means de-energization.

46. The exposure control system of claim 45 in which said electromagnetic means includes stop means engageable with said exposure regulator means, said stop means being configured to remain in said engagement until said exposure regulator means is caused to reassume said driven mode.

47. The exposure control system of claim 42 in which:
said exposure regulator means includes blade means movable toward one terminal position during said driven mode and toward another terminal position during said relaxation mode; and
said control means is operative to energize said electromagnetic means only when said blade means has attained said driven mode terminal position.

48. The exposure control system of claim 47 in which:
said control means is operative to activate said source of artificial light only following an interval of time commencing with said assumption of said relaxation mode and sufficient for said blade means to attain said relaxation mode terminal position.

49. The exposure control system of claim 48 in which said control means is operative to de-energize said electromagnetic means at the termination of a predetermined interval following the said assumption of said relaxation mode by said exposure regulator means.

50. The exposure control system of claim 49 in which said control means is operative to activate said means for energizing said source of artificial light in response to said electromagnetic means de-energization.

* * * * *